US007207499B2

(12) United States Patent
Partington et al.

(10) Patent No.: US 7,207,499 B2
(45) Date of Patent: Apr. 24, 2007

(54) APPARATUS AND METHOD FOR PRODUCING POROUS POLYMER PARTICLES

(75) Inventors: Barry Partington, deceased, late of Isle of Skye (GB); by Ann Partington, legal representative, Isle of Skye (GB); Josee Ethier, Quebec (CA)

(73) Assignee: Prometic Biosciences Ltd (GB)

( * ) Notice: Subject to any disclaimer, the term of this patent is extended or adjusted under 35 U.S.C. 154(b) by 0 days.

(21) Appl. No.: 10/343,354

(22) PCT Filed: Aug. 3, 2001

(86) PCT No.: PCT/CA01/01126

§ 371 (c)(1),
(2), (4) Date: Apr. 5, 2004

(87) PCT Pub. No.: WO02/12374

PCT Pub. Date: Feb. 14, 2002

(65) Prior Publication Data

US 2005/0006496 A1    Jan. 13, 2005

(30) Foreign Application Priority Data

Aug. 3, 2000    (CA)    ..................................... 2314921

(51) Int. Cl.
*B05B 17/04*    (2006.01)
(52) U.S. Cl. .............................. 239/7; 239/67; 239/69; 239/103; 239/121; 239/136; 239/222.11; 239/223; 239/224

(58) Field of Classification Search ... 239/222.11–224, 239/120–122, 103, 136, 67–70, 7, 214.15; 118/323, 302, DIG. 16
See application file for complete search history.

(56) References Cited

U.S. PATENT DOCUMENTS

| 1,506,226 | A | * | 8/1924  | Dick ........................... 239/224 |
| 2,645,525 | A | * | 7/1953  | Nyrop ..................... 239/214.25 |
| 3,017,116 | A | * | 1/1962  | Norris ......................... 239/702 |
| 3,556,400 | A | * | 1/1971  | Gebhardt et al. ........... 239/702 |
| 3,883,281 | A |   | 5/1975  | Holley |
| 3,887,133 | A | * | 6/1975  | Straarup et al. ............ 239/224 |
| 4,100,236 | A |   | 7/1978  | Gordon et al. |
| 4,121,770 | A | * | 10/1978 | Straarup et al. ............ 239/224 |
| 4,244,318 | A | * | 1/1981  | Chen ........................... 118/52 |

(Continued)

FOREIGN PATENT DOCUMENTS

EP    0 596 428 A1    5/1994

(Continued)

*Primary Examiner*—Steven J. Ganey
(74) *Attorney, Agent, or Firm*—Saliwanchik, Lloyd & Saliwanchik

(57) ABSTRACT

An apparatus and method for producing porous polymer particles is disclosed. The apparatus includes a rotating atomizer wheel (39) onto which a uniform thin layer of a polymer may be applied via a distributor (40), followed by the movement of the polymer to the periphery of the wheel due to centrifugal force and the subsequent release of free flying particles at the periphery of the wheel. The apparatus further includes a catch tray (14) to collect the porous polymer particles produced and an enclosure defining a partition between an interior environment and an exterior environment of the apparatus. The enclosure includes an aperture allowing a gaseous exchange between the interior and exterior environments.

35 Claims, 7 Drawing Sheets

U.S. PATENT DOCUMENTS

Figure 1:
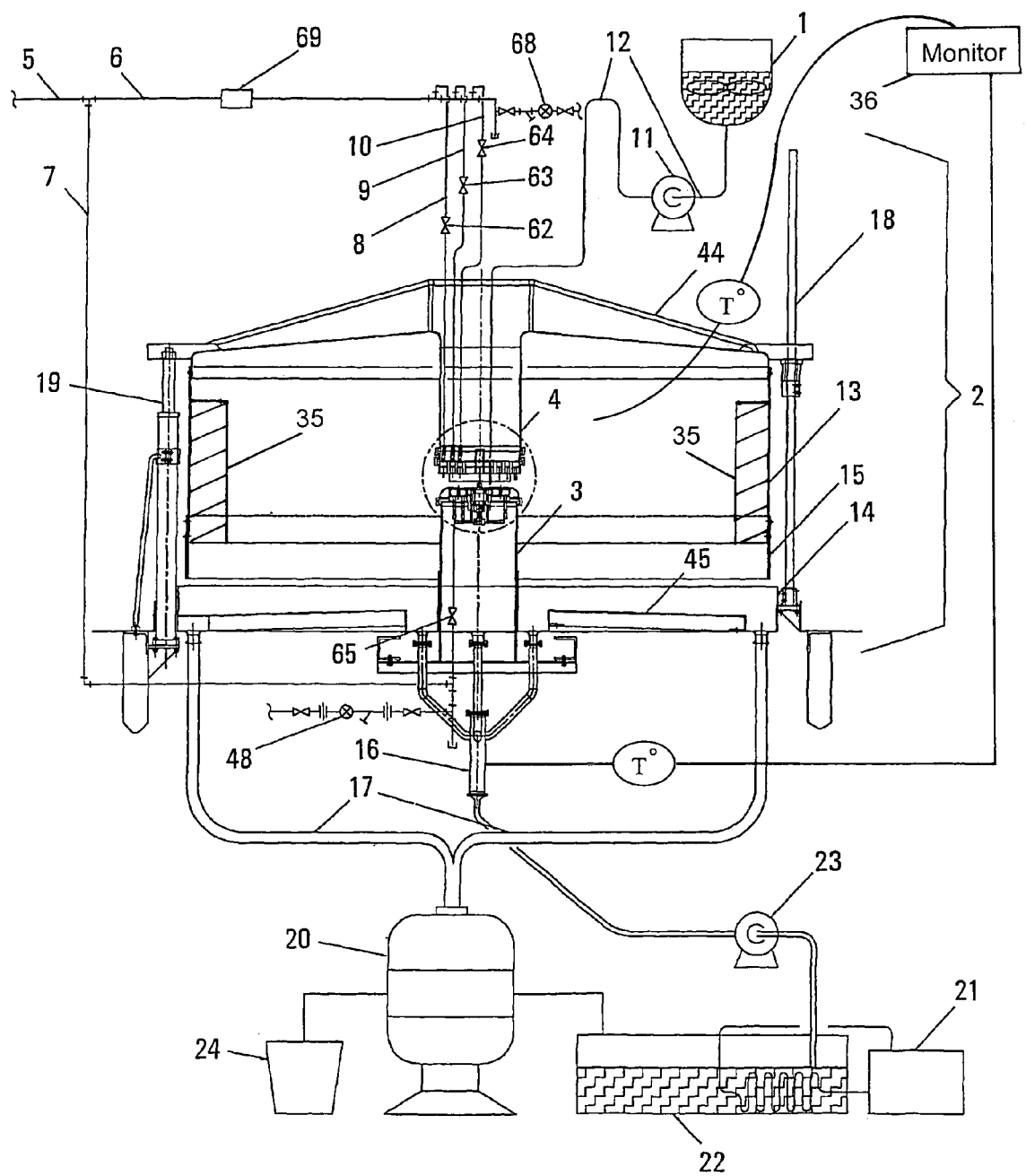
Figure 2:
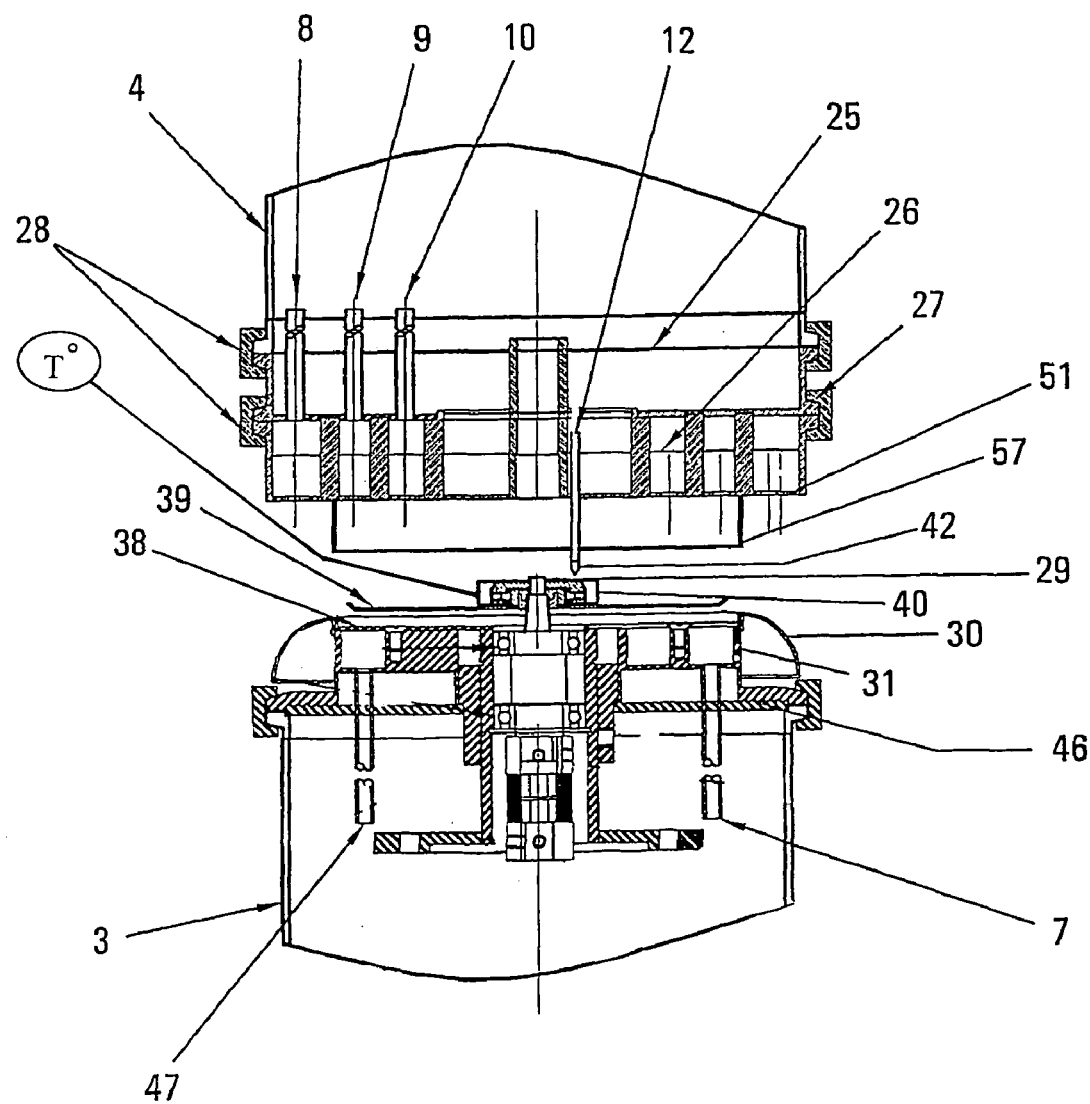
Figure 3A:
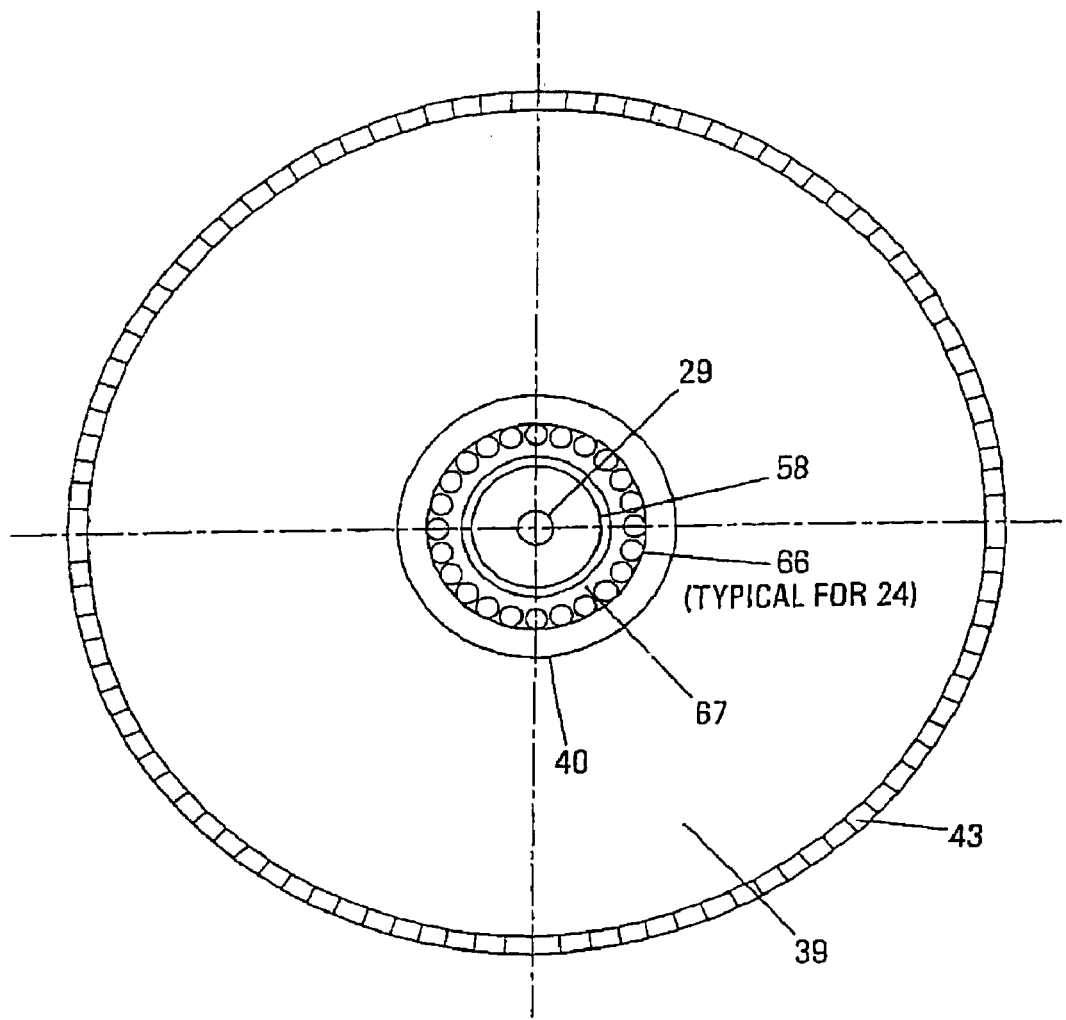
Figure 3B:
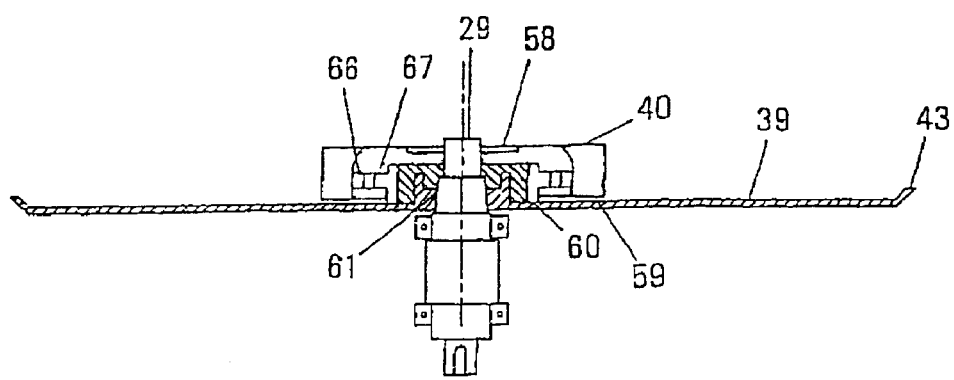
Figure 4A:
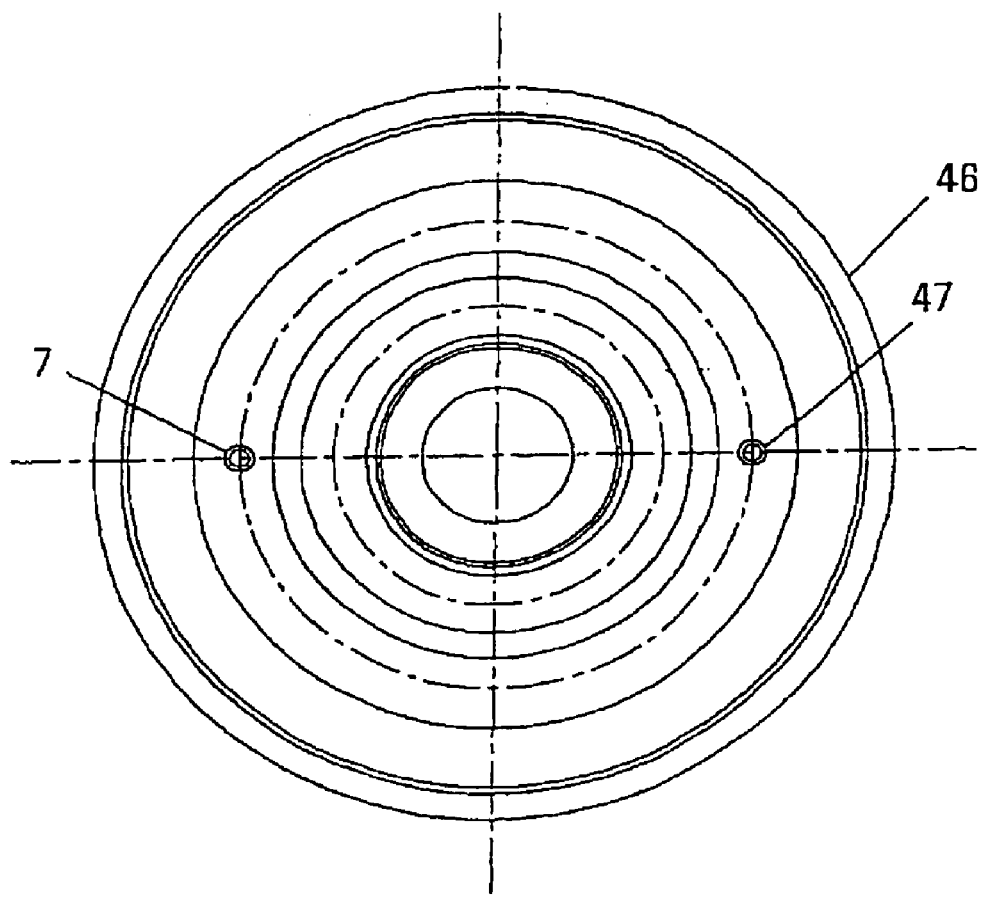
Figure 4B:
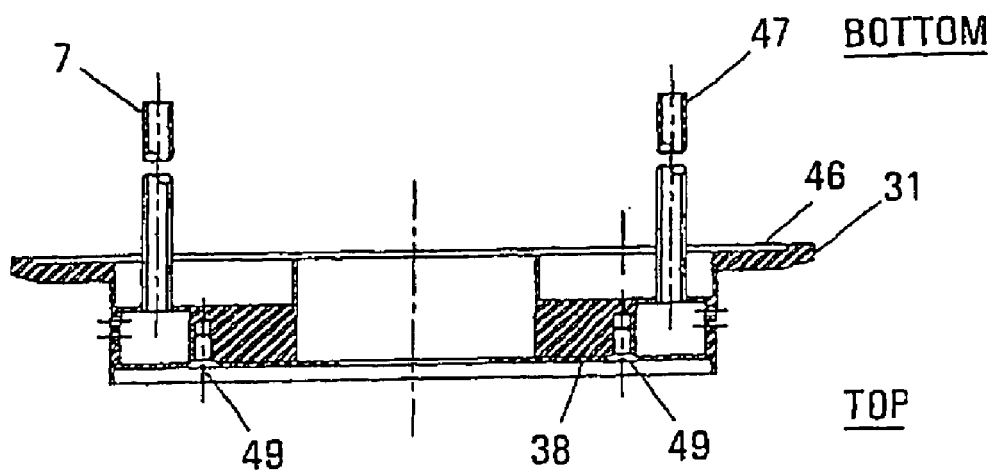
Figure 5:
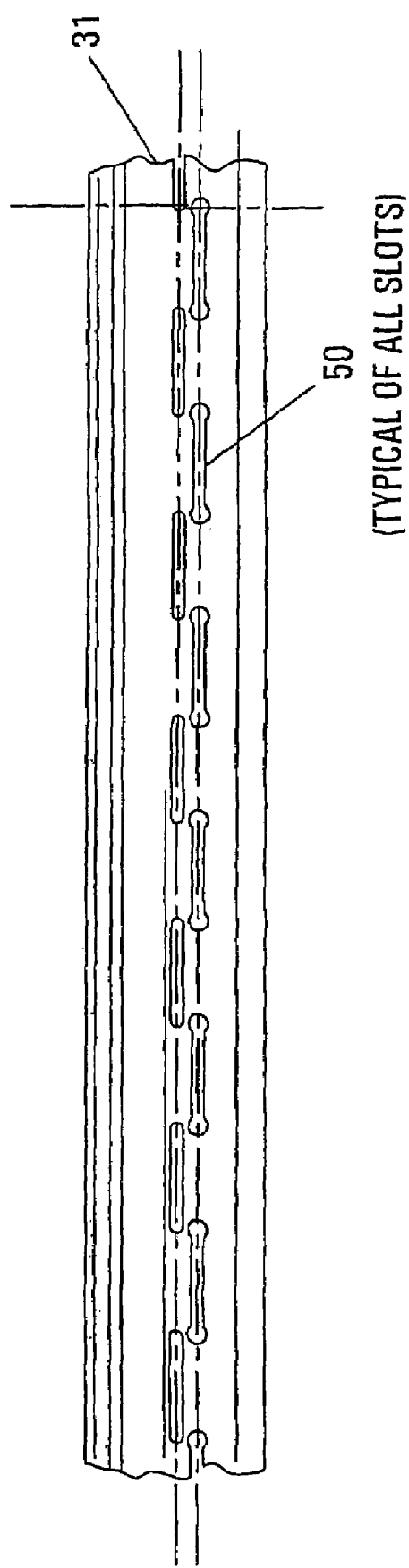
Figure 6A:
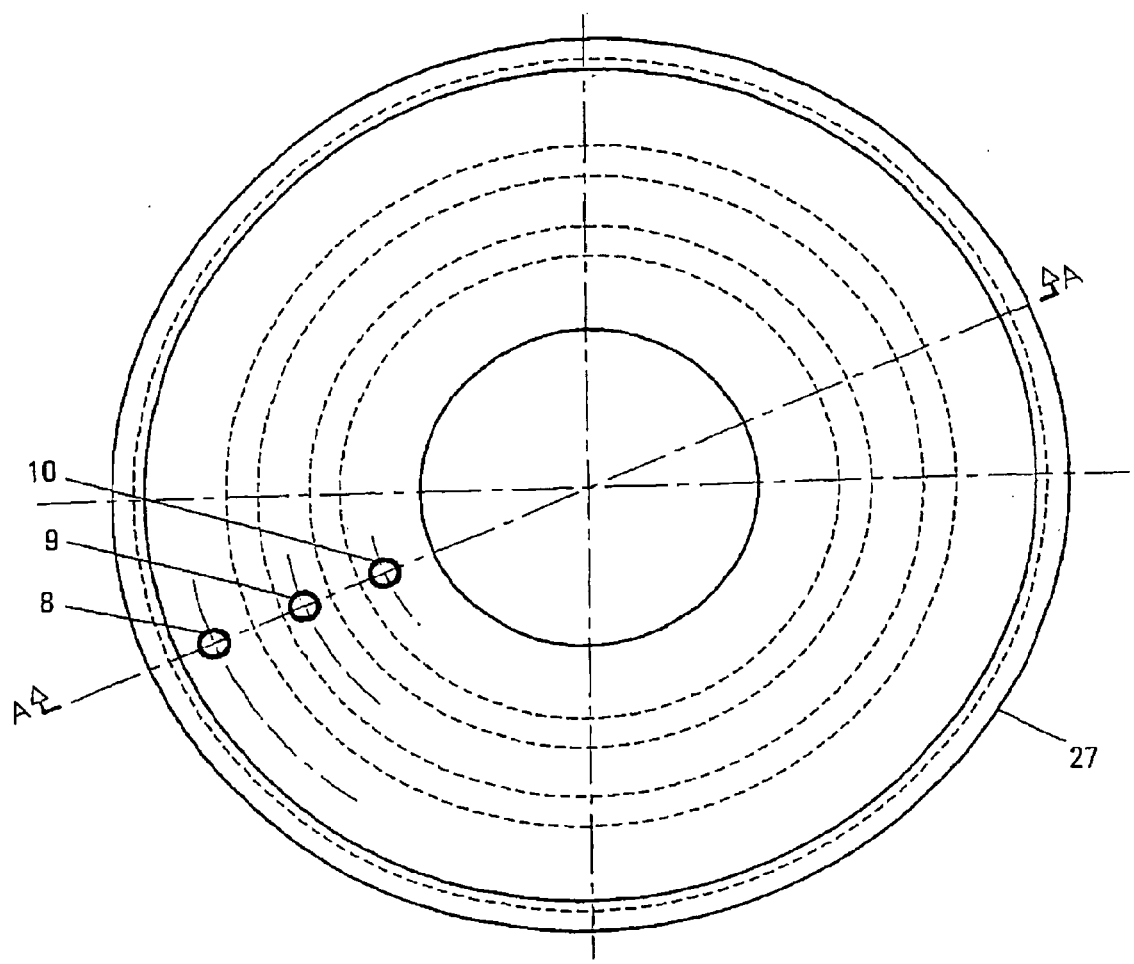
Figure 6B:
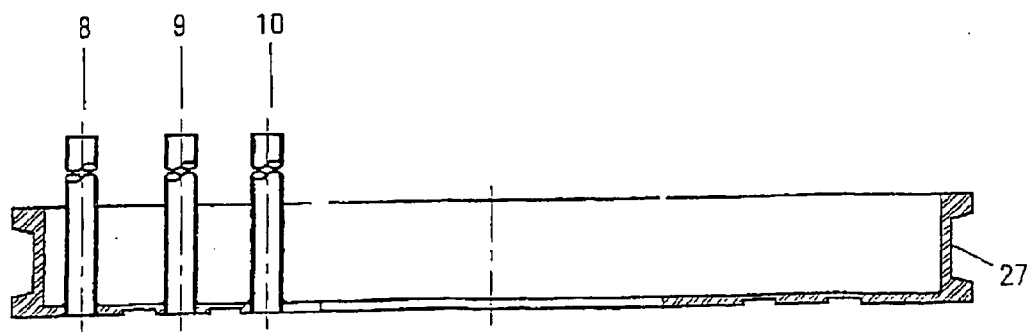
Figure 7A:
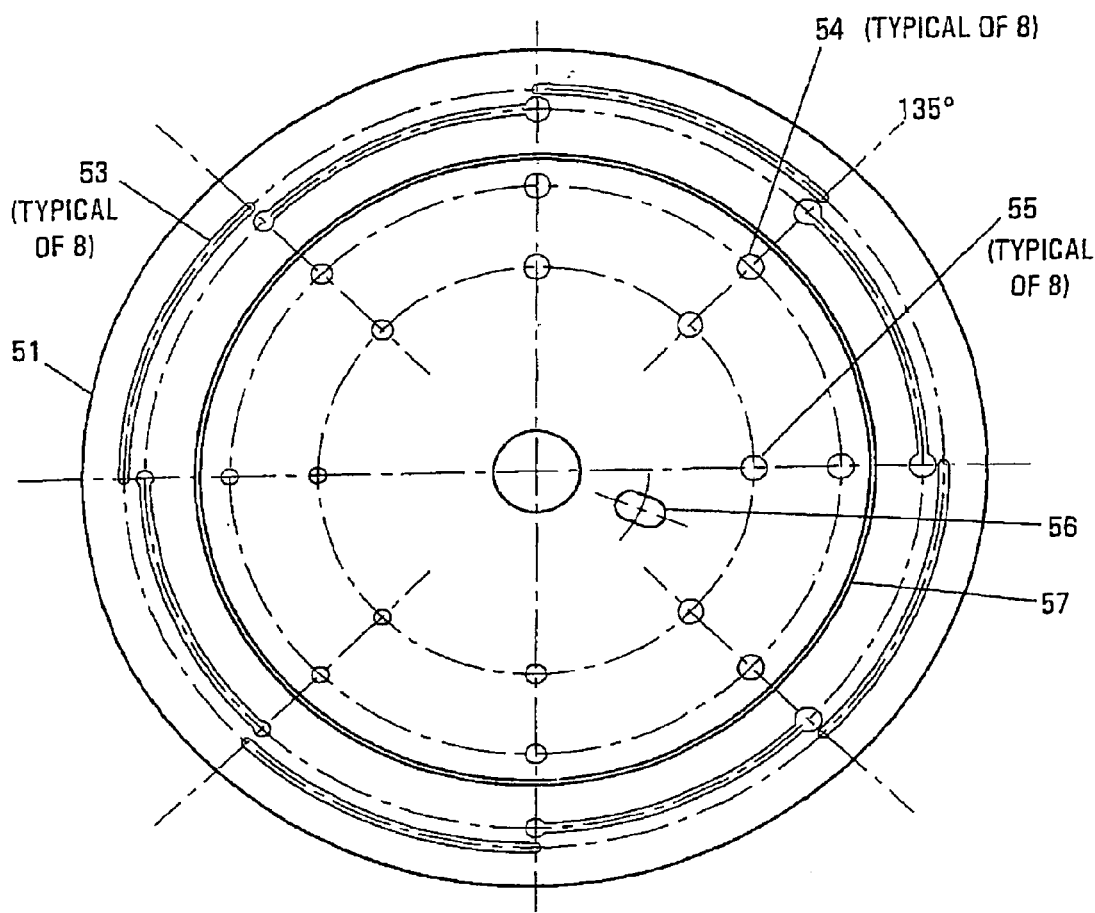
Figure 7B:
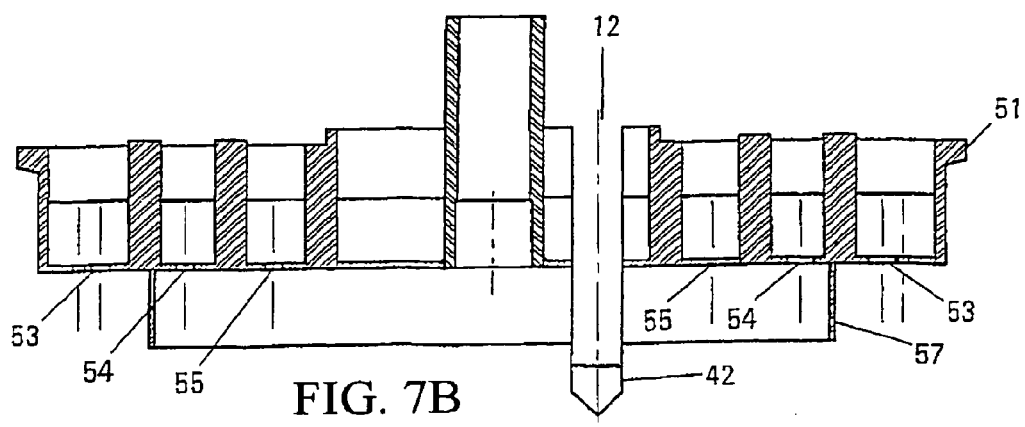

| | | | |
|---|---|---|---|
| 4,978,069 A * | 12/1990 | Andersson et al. | 239/224 |
| 5,064,949 A | 11/1991 | Steiner et al. | |
| 5,518,180 A * | 5/1996 | Svendsen | 239/224 |
| 5,927,306 A * | 7/1999 | Izumi et al. | 134/155 |
| 5,942,035 A * | 8/1999 | Hasebe et al. | 118/52 |
| 6,416,583 B1 * | 7/2002 | Kitano et al. | 118/680 |
| 6,585,169 B2 * | 7/2003 | Andersson | 239/7 |
| 6,634,568 B1 * | 10/2003 | Andersson et al. | 239/7 |
| 6,824,616 B2 * | 11/2004 | Kitano et al. | 118/666 |

FOREIGN PATENT DOCUMENTS

| | | |
|---|---|---|
| GB | 1 090 975 A | 11/1967 |

* cited by examiner

APPARATUS AND METHOD FOR PRODUCING POROUS POLYMER PARTICLES

This application is a National Stage Application of International Application Number PCT/CA01/01126, published, pursuant to PCT Article 21(2).

FIELD OF THE INVENTION

The present invention relates to an apparatus and process for the formation of porous polymer particles for use in chromatography techniques.

BACKGROUND

The capacity of certain porous support particles to cause selective retardation based on either size or shape is well known. Such particles are used in chromatographic separation techniques, for example gel filtration, to separate biological macromolecules, e.g. proteins, DNA, RNA polysaccharides and the like. The sieving particles are characterized by the presence of a microporous structure that exerts a selective action on the migrating solute macromolecules, restricting passage of larger particles more than that of the smaller particles. Thus, the utility of sieving lies in the capacity of the particles to distinguish between molecules of different sizes and shapes.

Affinity chromatography is a chromatographic method used for the isolation of proteins and other biological compounds. This technique is performed using an affinity ligand attached to a support particle and the resulting adsorbent packed into a chromatography column. The target protein is captured from solution by selective binding to the immobilized ligand. The bound protein may be washed to remove unwanted contaminants and subsequently eluted in a highly purified form.

Good separation using chromatography techniques depends on the size of particles, the size distribution of particles and the porosity of the particles. The beads, once packed into a column, should be of a high strength in order to support the liquid flow rates observed during purification and column regeneration. The effect of polymer concentration and other preparation parameters on agarose particle porosity and strength are presented in S. Hjertén and K. O. Eriksson, *Analytical Biochemistry*, 137, 313–317 (1984), herein incorporated by reference. Additional fundamental information is presented in *Studies on Structure and Properties of Agarose*, A. S. Medin, pH.D. Thesis, Uppsala, 1995, herein incorporated by reference. The description of chemical additives that help to improve the agarose particle porosity are found in M. Letherby and D. A. Young, *J. Chem. Soc., Faraday Trans.* 1, 77, 1953–1966 (1981) and in M. Tako and S. Nakamura, *Carbohydrate Research*, 180, 277–284 (1988), both herein incorporated by reference.

Many particle formation methods and apparatus have been developed using centrifugal action to divide a liquid or into droplets or particles. Rotary atomizer machines in general are discussed in the text *Spray Drying Handbook*, K. Masters, Fifth edition, Longman Scientific & Technical, Longman Group UK Limited, herein incorporated by reference. Other relevant references related to atomization are *Atomization and Sprays*, A. Lefebvre, Hemisphere Publications, 1989 and *Liquid Atomization*, L. Bayvel and Z. Orzechowski, Taylor and Francis, 1993, both herein incorporated by reference. A fundamental theory used in the present invention is known as "spray congealing", based on spray drying principles with the exception that solidification is the objective instead of drying. Traditional emulsion based methods for agarose bead preparation are described in, for example, *Studies on Structure and Properties of Agarose*, A. S. Medin, pH.D. Thesis, Uppsala, 1995 and in "The Preparation of Agarose Spheres for Chromatography of Molecules and Particles", *Biochimica et Biophysica Acta*, 79, 393–398 (1964).

The particle size distribution produced by known apparatus and methods require further sorting steps or procedures in order to select particles of uniform size required for chromatography. The additional sorting steps introduce further costs that could be avoided if the factors determining size distribution of the particles and operating variables are closely controlled. Without additional sorting steps, the products manufactured by conventional rotary atomization or emulsion techniques cannot be used in applications where the size distribution of the particles must be very narrow. For example, when using particles in blood purification applications, small particles must be avoided as small particles could be caught by the carrier fluid and would result in contamination of the purified material. Of course a narrow particle size distribution improves performances of particles in many applications, including chromatographic applications.

Operating variables that influence droplet size produced from atomizer wheels and hence particle size include speed of rotation, wheel diameter, wheel design, feed rate, viscosity of feed and air, density of feed and air and surface tension of feed.

The atmosphere within which a particle passes is important in order to avoid reduction of pore size. In particular, humidity and temperature control avoids particle desiccation during polymerization and gelling stages. Particle desiccation reduces pore size. It is desirable to have a machine and process to produce particles using centrifugal action in such a manner as that the particles have a narrow particle size distribution with both high porosity and flow.

Lengthy consideration of prior art devices and processes has identified a number of factors that may be responsible for the wider size distribution of particles. Such factors include interruptions on the wheel surface that may impede radial acceleration of the particle solution and adhesion to the surface of the wheel; lack of adequate temperature control on the atomizer wheel that may result in changes in feed viscosity and particle structure; and uncontrolled airflow patterns at the perimeter of the atomizer wheel that may result in particle twinning due to collisions between particles prior to gelation and in undesired drying of the particles due to a modification in their path down from the wheel to the collecting liquid.

SUMMARY OF THE INVENTION

Applicants have recognized that control of humidity and temperature within specific parameters in the immediate area of the atomizer wheel will yield particles of a narrower size distribution than previously possible with both good porosity and rigidity.

Specifically, It has been discovered that the air flow rate, temperature and humidity may be controlled in the immediate area of the atomizer wheel with sufficient accuracy to produce particles of a narrow size distribution. Control of temperature and humidity is achieved by the combination of temperature and humidity control means and an enclosure comprising an aperture, thus partially enclosing the atomizer machine.

The apparatus and method of the present invention produce particles having improved properties including very good bead shape and a narrower size distribution than possible with conventional production apparatus and methods. The apparatus and method are particularly well suited for the production of agarose beads for use in chromatography.

According to a first broad aspect, the invention provides an atomizer machine for the production of porous polymer particles, comprising:
a) an atomizer wheel having an edge, wherein the wheel is rotatable about an axis;
b) a distributor for depositing polymer in fluid state to the wheel;
c) a catch tray disposed under the atomizer wheel to collect the polymer particles formed as a result of ejection of the polymer from the edge as the atomizer wheel rotates;
d) an enclosure, enclosing the atomizer wheel, the distributor and the catch tray, the enclosure defining a partition between an interior environment of the atomizer machine and an exterior environment of the atomizer machine;
e) an aperture on the enclosure allowing a gaseous exchange between the interior environment of the atomizer machine and the exterior environment of the atomizer machine.

In an embodiment, the above-mentioned aperture is of variable size.

In an embodiment, the above-mentioned enclosure includes a peripheral wall surrounding the atomizer wheel, the distributor and the catch tray and a roof portion covering the peripheral wall.

In an embodiment, the above-mentioned peripheral wall is generally circular.

In an embodiment, the above-mentioned aperture extends circumferentially along the peripheral wall.

In an embodiment, the above-mentioned peripheral wall includes an upper portion and a lower portion, the aperture being defined between the upper portion and between the lower portion.

In an embodiment, the above-mentioned atomizer machine further comprises an actuator to displace the upper portion and the lower portion with relation to one another to vary the size of the aperture.

In an embodiment, the above-mentioned actuator is operative to displace the upper portion along the axis to vary the size of the aperture.

In an embodiment, the above-mentioned atomizer machine includes a temperature control unit to regulate a level of temperature in the interior environment.

In an embodiment, the above-mentioned atomizer machine includes a humidity control unit to regulate a level of humidity in the interior environment.

In an embodiment, the above-mentioned temperature control unit comprises at least one of: a unit for controlling a size of the aperture, a unit for controlling a level of temperature of the distributor and wheel, a unit for controlling a level of temperature and a flow rate of water in the catch tray, at least one valve providing at least one respective vapor stream at a periphery of the atomizer wheel, over the wheel and in the enclosure, and at least one steam trap for de-misting air in the interior environment and preventing water droplets from falling on the atomizer wheel.

In an embodiment, the above-mentioned humidity control unit comprises at least one of: a unit for controlling a size of the aperture, a unit for controlling a level of temperature of the distributor and wheel, a unit for controlling a level of temperature and a flow rate of water in the catch tray, at least one valve providing at least one respective vapor stream at a periphery of the atomizer wheel, over the wheel and in the enclosure, and at least one steam trap for de-misting the air in the interior environment and preventing water droplets from falling on the atomizer wheel.

In an embodiment, the above-mentioned atomizer machine further comprises a monitor capable of indicating a level of temperature in the interior environment.

In an embodiment, the above-mentioned atomizer machine further comprises a monitor capable of indicating a level of humidity in the interior environment.

In an embodiment, the above-mentioned atomizer machine further comprises a trajectory control means to control a trajectory of the particles from a periphery of the atomizer wheel to the catch tray.

In an embodiment, the above-mentioned trajectory control means comprises a unit for controlling a size of the aperture, disposing steam valves at the periphery of the atomizer wheel, over the atomizer wheel and directly into the enclosure, and controlling airflow patterns at the periphery of the atomizer wheel.

In an embodiment, the above-mentioned atomizer machine further comprises a reactor for producing the polymer and at least one temperature controlled conduit for feeding the polymer to the distributor.

In an embodiment, the above-mentioned at least one conduit consists of a double jacket tube defining an inner passage for feeding the polymer to the distributor and an outer envelope surrounding the inner passage, through which outer envelope a temperature liquid is flowed to control a level of temperature of the polymer.

In an embodiment, the above-mentioned distributor rotates in the same direction as the atomizer wheel.

In an embodiment, the above-mentioned distributor comprises a plurality of holes.

In an embodiment, the above-mentioned plurality of holes are disposed in a circle.

In an embodiment, the above-mentioned distributor has 24 holes.

In an embodiment, the above-mentioned atomizer wheel has a flat surface.

In an embodiment, the above-mentioned atomizer machine further comprises a shaft for receiving the atomizer wheel, the shaft being conical and tapered so as to reduce vibrations during rotation of the atomizer wheel.

In an embodiment, the above-mentioned atomizer machine further comprises a shaft for receiving the atomizer wheel, the shaft having a threaded section for securing the atomizer wheel to the shaft.

In an embodiment, the above-mentioned atomizer machine further comprises a sorting bin for receiving and sorting the particles from the catch tray.

In an embodiment, the above-mentioned atomizer wheel has a perimeter, the perimeter having radially projecting teeth.

In an embodiment, the above-mentioned atomizer machine further comprises at least one baffle disposed within the enclosure for regulating air flow within the internal environment.

In an embodiment, the above-mentioned at least one baffle is a plurality of baffles.

In an embodiment, the above-mentioned plurality of baffles is 4 baffles.

According to a second broad aspect, the invention provides a method for producing polymer particles, the method comprising:

a) providing an atomizer wheel, distributor and a catch tray enclosed by an enclosure defining a partition between an interior and an exterior environment and having an aperture for allowing gaseous exchange between the interior and the exterior environment; and b) allowing gaseous exchange through the aperture thereby to regulate at least one condition of temperature, humidity or air flow within the interior environment.

In an embodiment, the above-mentioned method further comprises varying a size of the aperture to vary a rate of gaseous exchange.

In a further embodiment, the above mentioned enclosure comprises a dome. The dome partially enclosing the atomizer machine at once creates an open-system and creates a zone surrounding the machine. The open system is necessary to obtain an air flow current from within the zone to the exterior of the zone. The air flow current contributes to the control of temperature and humidity by preventing build-up of heat within the immediate vicinity of the wheel as a result of rapid rotation of the wheel. The creation of a zone surrounding the machine is necessary to define an area within which a desired temperature and humidity profile may be maintained. It has been found that accurate control of the factors that determine the temperature and humidity surrounding the machine is not possible in absence of a structure that defines a zone within which the temperature and humidity control means operate to maintain the desired temperature and humidity profile. Advantageously, the dome is adjustable, thus providing adjustment of the aperture size, to compensate for variations in the factors that affect the temperature and humidity in the immediate vicinity of the gel and particles.

Temperature, humidity and turbulence of the air surrounding the apparatus and inside the apparatus affect the properties of beads: porosity, flow, average particle size, particle size distribution, bead shape and non-specific binding.

In a further embodiment, the invention further provides an atomizer machine for the production of porous polymer particles having a narrow size distribution comprising:

a) an atomizer wheel rotating about an axis;

b) a distributor for providing a uniform thin layer of a gelatinous polymer on the wheel;

c) a shaft connecting the wheel to a rotor;

d) a catch tray disposed under the wheel to collect the particles;

e) a dome partially enclosing the atomizer wheel and catch tray so as to maintain an open system and defining a zone surrounding the wheel and catch tray;

f) a means for temperature and humidity control for creating and maintaining a temperature and humidity gradient within the zone;

wherein the gelatinous polymer deposited on the rotating wheel moves to the periphery of the wheel under action of centrifugal force, the film being broken into free flying particles at the edge of the wheel.

These and other aspects of the invention shall become apparent to those of ordinary skill in the art upon consideration of the following description of specific embodiments in conjunction with the accompanying drawings.

BRIEF DESCRIPTION OF THE DRAWINGS

In the drawings:

FIG. 1 illustrates an apparatus for producing porous particles according to an embodiment of the invention;

FIG. 2 illustrates the central column of the apparatus of FIG. 1 showing bottom and top steam diffusers and shaft-wheel-distributor assembly;

FIG. 3A illustrates a toy plan view of the shaft-wheel-distributor assembly of FIG. 2;

FIG. 3B illustrates a side cut-away view of the shaft-wheel-distributor assembly of FIG. 3A.

FIG. 4A is a bottom plan view of the bottom steam diffuser of FIG. 2 that distributes steam to the edge of the wheel;

FIG. 4B is a side cut-away view of the bottom steam diffuser of FIG. 4A;

FIG. 5 is a side view of the bottom steam diffuser of FIG. 2;

FIG. 6A is a top plan view of the top steam diffuser of FIG. 2;

FIG. 6B is a partial side cut-away view of the top steam diffuser of FIG. 6A;

FIG. 7A is a bottom plan view of the top steam diffuser of FIG. 2;

FIG. 7B is a partial side cut-away view of the top steam diffuser of FIG. 7A.

DETAILED DESCRIPTION OF THE INVENTION

One embodiment of the liquid atomization apparatus of the invention is illustrated in FIG. 1. A solution comprising a polymer is prepared in reactor (1). Solid particles are formed from the solution in a beader (2). A heated tube (12) connects the reactor (1) to the beader (2). The apparatus and method of the invention will be described in conjunction with the production of agarose beads. However, the apparatus may be used to produce particles of any other polymer.

The polymer is first slowly poured into a solvent, in an embodiment, at room temperature, under vigorous stirring in a sealed stainless steel reactor (1), yielding a mixture. Suitable solvents include, but are not limited to, water, aqueous salt solutions, and organic solvents. The mixture is heated up to over 90° C. to allow a complete dissolution of the agarose, forming a solution. The solution is quickly cooled down to an intermediate temperature between dissolution and gelling temperatures, where a special additive can be added to the solution in order to improve bead porosity. This additive or chemical can be any chemical that helps obtain improved porosity, such as a salt (for example, ammonium sulfate) or a surfactant, in an embodiment, ammonium sulfate. Then, the solution is slowly cooled down to the process temperature, close enough to the gelling temperature, at a rate, for example, of up to about 0.5° C./min, in an embodiment, not more than 0.1° C./min.

Once the gel has reached its process temperature it is pumped through a heated conduit (12) consisting of a double jacket tube defining an inner passage for feeding the polymer to the distributor and an outer envelope surrounding the inner passage, through which outer envelope a liquid is flowed to control a level of temperature of the polymer from the reactor (1) to a nozzle (42), using a gear pump (11) also maintained at the gel process temperature by means of a pump head heater (not illustrated). The gel is supplied to a distributor (40) by the nozzle (42), and evenly distributed on the atomization wheel (39) by means of a distributor (40). A thin uniform layer is formed by both centrifugal force and the use of the distributor (40), and split by teeth (43) into filaments, which are broken in uniform sized spheres by the air flowing at the atomization wheel (39) edge. The beads travel through the surrounding air in the dome (13) aided by at least one, preferably four, baffles (35), where relative humidity and temperature are accurately controlled (from hot and humid at the atomization wheel (39) edge to less hot and less humid air at the catch tray (14) level) before they fall into the catch tray (14). The temperature and humidity profiles in the dome (13), between the atomization wheel (39) and surface of the catch tray (45), are accurately controlled in order to make sure that the bead formed turns into a solid phase prior to reaching the catch tray surface. A liquid, for example water, is continuously recirculated at a flow rate in a closed loop from the catch tray (14) to a sorting bin (20) and back to the catch tray via a recirculation pump (23). The low rate is adjusted in such a way that the surface of the catch tray (45) is always covered with a thin continuous layer of liquid. A heat exchanger (21) is installed in the inlet reservoir (22) of the recirculation pump (23) to control the catch tray (14) temperature. The beads can be collected at the outlet of the sorting bin (20) in a sealed bucket (24) for packaging.

The beader (2) thus contains a dome (13) and a catch tray (14). The dome (13) is not attached to the catch tray (14), leaving the beader (2) open for air exchanges with the production room. The dome skirt (15) controls the gap between the dome (13) and the catch tray, which is responsible for the fresh air inlet into the process. Therefore, the dome (13) defines a zone surrounding the apparatus and partially encloses the atomizer wheel in an open system. In certain embodiments, the temperature and humidity of the ambient air in the production room should be accurately controlled between 20–23° and 25–75% humidity, respectively, in order to get an adequate temperature and humidity profile in the dome (13). In an embodiment, the subject invention further comprises one or more monitors, as illustrated in FIGS. 1 and 2, capable of indicating a level of temperature and/or humidity in the interior environment of the device. Deviations from these recommended adjustments could be compensated by variations in other process parameters such as the gap between the dome (13) and the catch tray (14) as an example.

The catch tray (14), which has a slope from the center to the edge, collects the beads off the atomization wheel in a liquid that is in continuous recirculation. In order to allow the dome to move up and down for maintenance, cleaning and atomization wheel (39) installation, a system of, for example, at least one rod with an air cylinder, for example, three rods (18) with three air cylinders (19), may be used. A rigid structure (44) stabilizes the dome and avoids any instability that could result in vibration or movements of the dome (13).

Two columns are included in the beader: a top column (4), which is attached to the dome (13), and a bottom column (3), which is attached to the catch tray (14). These two columns are clearly illustrated in drawings 2 to 7. The bottom column (3) holds the atomization wheel and helps in the control of temperature and humidity profiles in the dome (13), while the top column (4) controls the environment over the atomization wheel and helps in the control of the temperature and humidity in the dome (13). For maximum advantage, these two columns should be centered at all times. Both the rods (18) and the rigid structure (44) of the dome (13) guarantee centering of the two columns (3) and (4). A main steam supply (5) is split in two steam lines (6) and (7), that are required for the control of both temperature and humidity in the dome (13).

A collecting liquid (water in the illustrated example) is distributed from the inlet reservoir (22) to the catch tray (14) through a splitter (16) which can be located at the center of the catch tray (14). The liquid forms a uniform and evenly distributed thin film on the catch tray surface (45) and ends in tubes (17) that are connected to the sorting bin (20). For maximum advantage, the catch tray surface (45) should be continuously covered by a thin layer of liquid in order to prevent drying of the beads as they fall on the catch tray (14). The liquid flow rate in the catch tray (14) and its temperature affect the control of humidity and temperature in the dome (13).

The center part of the dome is illustrated in FIG. 2. A flat atomization wheel (39) that, in certain embodiments, can have radially projecting teeth (43) at an edge thereof, is covered by a distributor (40), which is centered with the atomization wheel (39) and, in certain embodiments, rotates at the same speed as the atomization wheel. A plate (58) is screwed to the tapered shaft (29), keeping the atomization wheel-distributor assembly in place. The distributor (40) is the recipient for the gel that comes out from a nozzle (42). The gel falls on a distributor lip (67), which is filled with holes (66), allowing the gel to be evenly distributed at the bottom of the distributor (40). These holes should occupy almost all the distributor lip (67) surface and be spaced in such a way that sufficient strength of the distributor (40) is maintained. An inside cylinder (60) of the distributor (40) is longer than an outside cylinder (59) giving a constant and reproducible gap between the atomization wheel (39) and the distributor (40). This design avoids the use of spacers, which would unbalance the atomization wheel-distributor assembly and increase particle size distribution. In mounting high speed rotary bodies it is advantageous that the rotating mass be balanced. A suitable mounting arrangement for securely positioning the wheel on the rotatable shaft is to use a tapered shaft (29) in order to make atomization wheel-shaft alignment easy and reproducible and to maintain balancing. The inside of the atomization wheel (39) is machined with the same slope as the tapered section (61) of the tapered shaft (29). In an embodiment, the atomization wheel (39) does not touch the bottom of the tapered section (61) but is supported by the tapered section (61) itself. This has been designed to avoid any screwed part that would make the alignment difficult to reproduce. For maximum advantage, the tapered shaft-atomization wheel-distributor assembly should be balanced, advantageously, at all speeds within the rotation speed range utilized, to eliminate vibration.

The atomization wheel (39) stands over a bottom steam diffuser (31), which helps the regulation of temperature and humidity in the dome (13) and in the area close to the atomization wheel (39). The bottom steam diffuser (31) is connected to a bottom steam line (7) where a steam trap (48) removes any steam condensate located in the bottom steam line (7). A needle valve (65), located as close as possible to the steam trap (48), accurately controls the steam flow rate to the bottom steam diffuser (31). Steam is distributed into the dome (13) via slots (50) located on the side of the bottom steam diffuser (31). A bottom plate (46) and a top plate (38) are part of the bottom steam diffuser (31) and can be affixed to it using screws (49), for example. A drain (47) allows the evacuation of any condensation that could occur in the bottom steam diffuser (31) and avoids water accumulation that would result in steam bubbling and result in a change in humidity and temperature conditions in the dome (13). An annular plate (30) having holes, for example, very small holes, covers the side of the bottom steam diffuser (31). The small holes of the annular plate (30) cover a limited sector of the annular plate (30). For example, the sector may be defined by the first 60° starting at the bottom of the annular plate (30), in order to guide the steam in the dome (13) and not under the atomization wheel (39) or at the atomization wheel (39) edge, close to the teeth (43). The bottom column (3) also holds a motor (not illustrated) that controls atomization wheel (39) RPMs (revolutions per minute).

The top steam diffuser (26) is connected to the top column (4) using flange (28), spacer (25) and connection (27). The spacer (25) and connection (27) avoid any chimney effect in the top column (4) that could result from the high spinning rate of the atomization wheel and thus affect the temperature and humidity conditions in the dome (13) and in the area close to and above the atomization wheel (39). The steam in the top steam line (6) goes through a demister (69) where most water drops resulting from steam condensation are removed. A steam trap (68) completes condensate removal from the top steam line (6). The top steam line (6) is then split into three steam lines (8), (9) and (10), where needle valves (62), (63) and (64) respectively, accurately control the steam flow rate in the areas of the top steam diffuser (26). The first steam line (10) is split into a group of holes (55) located immediately above the distributor (40), and keeps the air above the distributor (40) fully saturated in order to prevent the liquid sprayed from drying under the effect of the fast air flow rate generated by pumping caused by the rotation of the atomization wheel (39). The second steam line (9) is split into a second group of holes (54) forming a circle located outside the distributor (40) but still above the atomization wheel (39). This second steam line (9) is also required to avoid drying of the liquid on the atomization wheel (39) but also to maintain the required temperature profile above the atomization wheel (39). A ring (57) restricts exchanges between the dome (13) and the area above the atomization wheel (39) and helps to control temperature and humidity conditions above the atomization wheel (39). The third steam line (8) supplies steam to a group of holes (53) located above the atomization wheel (39) but outside the ring (57), directing steam in the dome (13), close to the atomization wheel (39) edge.

The combination of appropriate adjustments to the following process parameters combined with the presence of a demister (69), steam traps (48) and (68), bottom steam diffuser (31) and top steam diffuser (26) controls the temperature and humidity profiles in the dome (13), in the area above the atomization wheel and at the atomization wheel edge: distance between the dome (13) and the catch tray (14), steam pressure, temperature and flow rate of the liquid in the catch tray, humidity and temperature of the air surrounding the apparatus (production room), needle valves (62), (63), (64), (65) adjustments, distance between the atomization wheel (39) and the ring (57) of the top steam diffuser (51), atomization wheel (39) spinning rate, distance between the atomization wheel (39) and the surface of the catch tray (45). These parameters control temperature and humidity profiles and are adjusted according to the product manufactured and desired properties.

Although various embodiments of the invention are disclosed herein, many adaptations and modifications may be made within the scope of the invention in accordance with the common general knowledge of those skilled in this art. Such modifications include the substitution of known equivalents for any aspect of the invention in order to achieve substantially the same result in substantially the same way. Numeric ranges are inclusive of the numbers defining the range. In the claims, the word "comprising" is used as an open-ended term, substantially equivalent to the phrase "including, but not limited to". The following examples are illustrative of various aspects of the invention, and do not limit the broad aspects of the invention as disclosed herein.

In an embodiment, the atomizer machine includes a temperature control unit to regulate a level of temperature in the interior environment.

In an embodiment, the atomizer machine includes a humidity control unit to regulate a level of humidity in the interior environment.

In an embodiment, the atomizer machine further comprises a sorting bin for receiving and sorting the particles from the catch tray.

In an embodiment, at least one conduit consists of a double jacket tube defining an inner passage for feeding the polymer to the distributor and an outer envelope surrounding the inner passage, through which outer envelope a temperature liquid is flowed to control a level of temperature of the polymer.

EXAMPLES

Particles produced by the apparatus and method of the present invention have a very narrow size distribution as illustrated by the following examples describing agarose bead manufacture. The polymer preparation steps and temperatures and most process parameters are specific to agarose preparation and could differ depending on the polymer used for particle formation.

Example 1

Preparation of 4% 100 μm Agarose Beads 300 g of agarose was slowly poured in 4.25 L of purified water under vigorous mixing. This solution was heated up to 97–99° C. for 30 minutes and cooled down to 70° C. A heating/cooling fluid was used in the jacket of the reactor to control the temperature accurately. 750 mL of a 0.75M ammonium sulfate solution, maintained at 70° C., was added very slowly and under vigorous stirring to the previous agarose solution in order to prevent local salting out, which would result in the formation of lumps. The final solution was cooled to 56–57° C. at a rate not more than 0.1° C./min.

In the meantime, the beader was started for stabilization. Atomization wheel-column centering was checked, and the distance between the atomization wheel and the top column was adjusted to 15 mm. The dome opening (distance between the dome and the catch tray) was adjusted to 7 cm. The atomization wheel speed was adjusted to 4900–5100 RPM , needle valves were all adjusted at 7 and steam pressure was set at 5 psig at the boiler outlet. These steam adjustments allowed the control of dome temperature at 36–39° C. close to the edge of the atomization wheel and were adequate for the product manufactured and the size of the dome. Approximately 60 L/minute of purified water maintained at 16–19° C. were recirculated in the catch tray to ensure that the catch tray surface is continuously covered with a thin film of water. This water flow rate is also appropriated for the control of temperature and humidity in the dome. Resulting stabilized beader temperatures were the following:

Atomization wheel temperature: 56–60° C.
Catch tray temperature: 16–19° C.
Dome temperature close to the atomization wheel edge: 37–39° C.
Temperature at area above atomization wheel: 71–73° C.

Once the beader was stabilized and the gel at the right temperature, the gear pump was turned on, feeding 1.6 L of gel/hr to the atomization wheel. The following properties were recorded:

| Properties/Lot | Specifications | Lot 000612381 | Lot 001016434 | Lot 001017435 |
|---|---|---|---|---|
| Porosity | | | | |
| Thyroglobulin | 0.35–0.53 | 0.44 | 0.48 | 0.48 |
| Apoferritin | 0.50–0.76 | 0.60 | 0.63 | 0.64 |
| β-Amylase | 0.54–0.80 | 0.64 | 0.67 | 0.68 |
| Alcohol Dehydrogenase | 0.58–0.86 | 0.69 | 0.72 | 0.72 |
| Albumin (Bovine Serum) | 0.61–0.91 | 0.72 | 0.74 | 0.76 |
| Carbonic Anhydrase | 0.68–1.00 | 0.85 | 0.85 | 0.87 |
| Pressure vs Flow | >20 cm/hr | 35 | 22 | 22 |
| Particle Size Analysis | | | | |
| Average Size (μm) | N/A | 106 | 103 | 101 |
| % Between 76–140 microns before sieving | N/A | 98% | 97.4% | 90% |
| % Between 76–140 microns after sieving | Greater than 95% | 99.7% | 99% | 99% |
| Non-Specific Binding | Less than 8 μg cyt./ml gel | 3.1 | 2.5 | 2.2 |
| Microscopy | Less than 3% broken, fused, damaged beads | 0.89% | 0.7% | 0.9% |

Process reproducibility has been demonstrated and is clearly documented. The particle size distribution before sieving is very narrow, a lot more than any equivalent product available on the market at the moment. The distribution can be significantly improved by sieving, without significantly reducing the global yield. As an example, a 5 L batch prepared as above gave reproducibly 6.5 to 6.8 L of beads.

Example 2

Preparation of 4% 100 μm Agarose Beads Using Apparatus Further Comprising Baffles A plurality of 3 inch or 6 inch baffles were inserted into the dome in order to get a more homogeneous temperature profile in the dome. Four baffles were equally distributed on the inside of the dome, vertically, to inhibit the effect of room conditions in the dome. With the baffles in place, the dome is less sensitive to ambient conditions, and dome conditions are more easily reproduced. In addition, a wider range of particle size can be produced in the same apparatus when the baffles are used. The increase in disk RPM required to produce smaller particles affects the air pattern and hydrodynamics in the dome. The presence of baffles makes the temperature profiles less dependant on disk RPM. Also, the production of large particles (above 200 microns) resulted in projection of particles on the walls of the dome, due to the inertia of the particles produced. The presence of baffles affects the air pattern in such a way that the particles formed fall closer to the bottom column, making possible the manufacture of large particles without changing the design of the equipment.

4% 100 microns agarose beads have been manufactured using conditions in the example above to demonstrate that the presence of baffles do not affect particle properties. Lot 001103443 was manufactured using 6" baffles, while lot 001113447 was manufactured using 3" baffles. Lot 000612381 is reproduced in the table for comparison purposes.

| Properties/Lot | Specifications | Lot 000612381 | Lot 001113447 | Lot 001103443 |
|---|---|---|---|---|
| Porosity | | | | |
| Thyroglobulin | 0.35–0.53 | 0.44 | 0.45 | 0.43 |
| Apoferritin | 0.50–0.76 | 0.60 | N/A | N/A |
| β-Amylase | 0.54–0.80 | 0.64 | N/A | N/A |
| Alcohol Dehydrogenase | 0.58–0.86 | 0.69 | N/A | N/A |
| Albumin (Bovine Serum) | 0.61–0.91 | 0.72 | N/A | N/A |
| Carbonic Anhydrase | 0.68–1.00 | 0.85 | N/A | N/A |
| Pressure vs Flow | >20 cm/hr | 35 | 28 | 24 |
| Particle Size Analysis | | | | |
| Average Size (μm) | N/A | 106 | 101 | 100 |
| % Between 76–140 microns before sieving | N/A | 98% | 97.0% | 97.2% |
| % Between 76–140 microns after sieving | Greater than 95% | 99.7% | 98.9% | 98.6 |
| Non-Specific Binding | Less than 8 μg cyt./ml gel | 3.1 | N/A | N/A |
| Microscopy | Less than 3% broken, fused, damaged beads | 0.89% | 1.9% | 1.5% |

Example 3

Preparation of 5% 200 μm Agarose Beads

A procedure similar to the one described for the preparation of 4% 100 microns agarose beads has been applied for the manufacturing of 200 microns agarose beads at the 2 L scale. The differences are set forth in the present description.

110 g of agarose was slowly poured in 1.7 L of purified water under vigorous mixing. This solution was heated up to 97–99° C. for 30 minutes and cooled down to 70° C. 300 mL of a 0.75M ammonium sulfate solution, maintained at 70° C., was added very slowly and under vigorous stirring to the previous agarose solution. The final solution was cooled to 55–57° C. at a rate not more than 0.1° C./min.

In the meantime, the beader was started for stabilization. The distance between the atomization wheel and the top column was adjusted to 15 mm. The dome opening was adjusted to 4 cm. The atomization wheel speed was adjusted to about 2000 RPM, needle valves were all adjusted at 3 and steam pressure was set at 5 psig at the boiler outlet. These steam adjustments allowed the control of dome temperature at 47–50° C. close to the edge of the atomization wheel and were adequate for the product manufactured and the size Approximately 60 L/minute of purified water maintained at 14–16° C. was recirculated in the catch tray. Resulting stabilized beader temperatures were the following:

Atomization wheel temperature: Not available due to the dome opening
Catch tray temperature: 14–16° C.
Dome temperature close to the atomization wheel edge: 47–50° C.
Temperature at area above atomization wheel: 78–80° C.

Once the beader was stabilized and the gel at the right temperature, the gear pump was turned on, feeding about 2.8 L of gel/hr to the atomization wheel. The following properties were recorded:

| Properties/Lot | Specifications | Lot 001116450 | Lot 001123453 |
|---|---|---|---|
| Porosity | | | |
| Thyroglobulin | N/A | 0.02 | 0.03 |
| Apoferritin | N/A | 0.46 | 0.11 |
| β-Amylase | N/A | 0.63 | 0.64 |
| Alcohol Dehydrogenase | N/A | 0.70 | 0.73 |
| Albumin (Bovine Serum) | N/A | 0.71 | 0.74 |
| Carbonic Anhydrase | N/A | 0.85 | 0.86 |
| Pressure vs Flow | N/A | 114 | 106 |
| Particle Size Analysis | | | |
| Average Size (μm) | N/A | 200 | 199 |
| % Between 150–300 microns before sieving | N/A | N/A | N/A |
| % Between 150–300 microns after sieving | N/A | 96% | 96% |
| Non-Specific Binding | N/A | N/A | N/A |
| Microscopy | N/A | 2.5 | 3.9 |

Example 4

Preparation of 4% 125 μm Agarose Beads

The procedure described for the production of 4% 100 microns agarose beads has been applied for the production of 4% 125 microns agarose beads at the 3 L scale. The differences are set forth in the present description.

180 g of agarose was slowly poured in 2.55 L of purified water under vigorous mixing. This solution was heated up to 97–99° C. for 30 minutes and cooled down to 70° C. 450 mL of a 0.75M ammonium sulfate solution, maintained at 70° C., was added very slowly and under vigorous stirring to the previous agarose solution. The final solution was cooled to 55–57° C. at a rate not more than 0.1° C./min.

In the meantime, the beader was started for stabilization. The distance between the atomization wheel and the top column was adjusted to 15 mm. The dome opening was adjusted to 7 cm. The atomization wheel speed was adjusted to 3700–3800 RPM, needle valves were all adjusted at 4–5 and steam pressure was set at 5 psig at the boiler outlet. These steam adjustments allowed the control of dome temperature at 35–37° C. close to the edge of the atomization wheel and were adequate for the product manufactured and the size of the dome. Approximately 60 L/minute of purified water maintained at 14–16° C. were recirculated in the catch tray. Resulting stabilized beader temperatures were the following:

Atomization wheel temperature: 56–58° C.
Catch tray temperature: 14–16° C.
Dome temperature close to the atomization wheel edge: 35–37° C.
Temperature at area above atomization wheel: 71–75° C.

Once the beader was stabilized and the gel at the right temperature, the gear pump was turned on, feeding about 1.9 L of gel/hr to the atomization wheel. The following properties were recorded:

| Properties/Lot | Specifications | Lot 010118464 | Lot 010124465 | Lot 010125466 |
|---|---|---|---|---|
| Porosity | | | | |
| Thyroglobulin | 0.35–0.53 | 0.45 | 0.47 | 0.48 |
| Apoferritin | 0.50–0.76 | N/A | N/A | N/A |
| β-Amylase | 0.54–0.80 | N/A | N/A | N/A |
| Alcohol Dehydrogenase | 0.58–0.86 | N/A | N/A | N/A |
| Albumin (Bovine Serum) | 0.61–0.91 | N/A | N/A | N/A |
| Carbonic Anhydrase | 0.68–1.00 | N/A | N/A | N/A |
| Pressure vs Flow | >30 cm/hr | 44 | 53 | 45 |
| Particle Size Analysis | | | | |
| Average Size (μm) | N/A | 124 | 120 | 123 |
| % Between 95–165 microns before sieving | N/A | N/A | N/A | N/A |
| % Between 95–165 microns after sieving | Greater than 95% | 99.5% | 98.5% | 99.5% |
| Non-Specific Binding | Less than 8 μg cyt./ml gel | N/A | N/A | N/A |
| Microscopy | Less than 3% broken, fused, damaged beads | 1.3 | 1.3 | 0.6 |

Example 5

Preparation of 4% 60 μm Agarose Beads

The procedure described for the production of 4% 100 microns agarose beads has been applied for the production of 4% 60 microns agarose beads at the 2 L scale. The differences are set forth in the present description.

120 g of agarose was slowly poured in 1.7 L of purified water under vigorous mixing. This solution was heated up to 97–99° C. for 30 minutes and cooled down to 70° C. 300 mL of a 0.75M ammonium sulfate solution, maintained at 70° C., was added very slowly and under vigorous stirring to the previous agarose solution. The final solution was cooled to 56–58° C. at a rate not more than 0.1° C./min.

In the meantime, the beader was started for stabilization. The distance between the atomization wheel and the top column was adjusted to 15 mm. The dome opening was adjusted to 7 cm. The atomization wheel speed was adjusted to 7200 RPM, needle valves were all adjusted at 7 and steam pressure was set at 5 psig at the boiler outlet. Those steam adjustments allowed the control of dome temperature at 33–35° C. close to the edge of the atomization wheel and were adequate for the product manufactured and the size of the dome. Approximately 60 L/minute of purified water maintained at 16–19° C. were recirculated in the catch tray. Resulting stabilized beader temperatures were the following:

Atomization wheel temperature: 56–58° C.
Catch tray temperature: 16–19° C.
Dome temperature close to the atomization wheel edge: 33–35° C.
Temperature at area above atomization wheel: 68–70° C.

Once the beader was stabilized and the gel at the right temperature, the gear pump was turned on, feeding about 0.6 L of gel/hr to the atomization wheel. The following properties were recorded:

| Properties/Lot | Specifications | Lot 001018436 | Lot 001019437 | Lot 001108446 |
|---|---|---|---|---|
| Porosity | | | | |
| Thyroglobulin | >0.20 | 0.56 | 0.47 | 0.45 |
| Apoferritin | N/A | N/A | N/A | N/A |
| β-Amylase | N/A | N/A | N/A | N/A |
| Alcohol Dehydrogenase | N/A | N/A | N/A | N/A |
| Albumin (Bovine Serum) | N/A | N/A | N/A | N/A |
| Carbonic Anhydrase | N/A | N/A | N/A | N/A |
| Pressure vs Flow | >5 cm/hr | 10 | 7 | 7 |
| Particle Size Analysis | | | | |
| Average Size (μm) | N/A | 59 | 61 | 59 |
| % Between 30–95 microns before sieving | N/A | 92.3% | 90.5% | 86.7% |
| % Between 30–95 microns after sieving | N/A | 91.3% | 90.5% | 90.5% |
| Non-Specific Binding | N/A | N/A | N/A | N/A |
| Microscopy | Less than 3% broken, fused, damaged beads | 0% | 1.3% | 0.8% |

Again lot 001108446 was manufactured using the 6" baffles as described in the example above and compared to the standard material to demonstrate that the presence of baffles do not affect the particle properties.

Example 6

Preparation of 6% 100 μm Agarose Beads

The procedure described for the production of 4% 100 microns agarose beads has been applied for the production of 6% 100 microns agarose beads at the 5 L scale. The differences are set forth in the present description.

380 g of agarose was slowly poured in 4.25 L of purified water under vigorous mixing. This solution was heated up to 97–99° C. for 30 minutes and cooled down to 70° C. 750 mL of a 0.75M ammonium sulfate solution, maintained at 70° C., was added very slowly and under vigorous stirring to the previous agarose solution. The final solution was cooled to 59–61° C. at a rate not more than 0.1° C./min.

In the meantime, the beader was started for stabilization. The distance between the atomization wheel and the top column was adjusted to 15 mm. The dome opening was adjusted to 7 cm. The atomization wheel speed was adjusted to 4900–5100 RPM, needle valves were all adjusted at 7–9 and steam pressure was set at 5 psig at the boiler outlet. Those steam adjustments allowed the control of dome temperature at 37–39° C. close to the edge of the atomization wheel and were adequate for the product manufactured and the size of the dome. Approximately 60 L/minute of purified water maintained at 16–20° C. were recirculated in the catch tray. Resulting stabilized beader temperatures were the following:

Atomization wheel temperature: 59–63
Catch tray temperature: 16–20° C.
Dome temperature close to the atomization wheel edge: 37–39° C.
Temperature at area above atomization wheel: 71–74° C.

Once the beader was stabilized and the gel at the right temperature, the gear pump was turned on, feeding about 1.7 L of gel/hr to the atomization wheel. The following properties were recorded:

| Properties/Lot | Specifications | Lot B28902 | Lot B32904 | Lot 001026439 |
|---|---|---|---|---|
| Porosity | | | | |
| Thyroglobulin | 0.25–0.44 | 0.28 | 0.31 | 0.27 |
| Apoferritin | 0.39–0.59 | 0.44 | 0.47 | N/A |
| β-Amylase | 0.48–0.72 | 0.50 | 0.52 | N/A |
| Alcohol Dehydrogenase | 0.49–0.73 | 0.56 | 0.57 | N/A |
| Albumin (Bovine Serum) | 0.52–0.78 | 0.59 | 0.62 | N/A |
| Carbonic Anhydrase | 0.66–0.98 | 0.73 | 0.77 | N/A |
| Pressure vs Flow | >45 cm/hr | 60 | 64 | 52 |
| Particle Size Analysis | | | | |
| Average Size (μm) | N/A | 101 | 101 | 102 |
| % Between 76–140 microns before sieving | N/A | 80.3 | 80.1 | 68% |
| % Between 76–140 microns after sieving | >95% | 99% | 99% | 99.4% |
| Non-Specific Binding | Less than 8 μg cyt./ml gel | 1.7 | 2.9 | N/A |
| Microscopy | Less than 3% broken, fused, damaged beads | 0% | 0.3% | 1.6 |

Batch 001026439 was produced using a higher pump flow rate. According to the theory, the pump flow rate could be significantly increased without affecting the product quality. This has been confirmed with lot 001026439, where the pump was increased to its limit and delivering about 3.5 L/hr of gel on the atomization wheel without affecting the properties only the particle size distribution before sieving was slightly broader when the pump flow rate is increased, resulting in a lower product yield. Therefore the gel flow rate fed to the atomization disk is not limited to the examples above, higher and lower feed rates can result in the same product.

In an embodiment, the atomizer machine may further comprise at least one baffle, in a further embodiment, a plurality of baffles, in a further embodiment, 4 baffles, which is/are disposed within the enclosure and can affect/regulate the air pattern in the interior environment.

The particles produced by the apparatus and process of present invention may be used in all the chromatographic and electrophoretic methodologies for industrial purification purposes including affinity chromatography, gel filtration, ion-exchange chromatography, as support for grafting different types of ligands; and coating rigid spheres of glass or plastic for types of chromatographic applications.

The invention claimed is:

1. An atomizer machine for the production of porous polymer particles, comprising:

a) an atomizer wheel having an edge, wherein said wheel is rotatable about an axis;

b) a distributor for depositing polymer in fluid state to said wheel, wherein said distributor has a lip with holes, wherein the holes occupy almost all the distributor lip surface and are spaced in such a way that sufficient strength of the distributor is maintained;

c) a catch tray disposed under the atomizer wheel to collect the polymer particles formed as a result of ejection of the polymer from the edge as the atomizer wheel rotates;

d) an enclosure, enclosing said atomizer wheel, said distributor and said catch tray, said enclosure defining a partition between an interior environment of said atomizer machine and an exterior environment of said atomizer machine and e) an aperture on said enclosure allowing a gaseous exchange between the interior environment of said atomizer machine and the exterior environment of said atomizer machine.

2. The atomizer machine as defined in claim 1, wherein said aperture is of variable size.

3. The atomizer machine as defined in claim 2, wherein said enclosure includes a peripheral wall surrounding said atomizer wheel, said distributor and said catch tray and a roof portion covering said peripheral wall.

4. The atomizer machine as defined in claim 3, wherein said peripheral wall is generally circular.

5. The atomizer machine as defined in claim 4, wherein said aperture extends circumferentially along said peripheral wall.

6. The atomizer machine as defined in claim 4, wherein said peripheral wall includes upper portion and a lower portion, said aperture being defined between said upper portion and between said lower portion.

7. The atomizer machine as defined in claim 6, further comprising an actuator to displace said upper portion and said lower portion with relation to one another vary the size of said aperture.

8. The atomizer machine as defined in claim 7, wherein said actuator is operative to displace said upper portion along said axis to vary the size of said aperture.

9. The atomizer machine as defined in claim 2, including a temperature control unit to regulate a temperature in siad interior environment.

10. The atomizer machine as defined in claim 9, further comprising a monitor capable of indicating a level of temperature in said interior environment.

11. The atomizer machine according to claim 9, wherein water in recirculated at a flow rate in a closed loop from the catch tray to a sorting bin and back to the catch tray via a recirculation pump, wherein the temperature control unit comprises at least one of: a unit for controlling a size of said aperture, a unit for controlling a level of temperature of the distributor and wheel, a unit for controlling a level of temperature and a flow rate of water in the catch tray, at least one valve providing at least one respective vapor stream at a periphery of said atomizer wheel.

12. The atomizer machine as defined in claim 11, further comprising a monitor capable of indicating a level of temperature in said interior environment.

13. The atomizer machine as defined in claim 2, including a humidity control unit to regulate a level of humidity in said interior environment.

14. The atomizer machine as defined in claim 13, further comprising a monitor capable of indicating a level of humidity in said interior environment.

15. Thr atomize machine according to claim 13, wherein water is recirculated at a flow rate in a closed loop from the catch tray to a sorting bin and back to the catch tray via a recirulation pump, wherein said humidity control unit comprises at least one of: a unit for controlling a size of said aperture, a unit for controlling a level of temperatre of the distributor and wheel, a unit for controlling a level of temperature and a flow rate of water in the catch tray, at least one valve providing at least one respective vapor stream at a periphery of said atomizer wheel periphery, over the wheel and in the enclosure, and at least one steam trap for de-misting the air in the interior environment and preventing water droplets from falling on said atomizer wheel.

16. The atomizer machine as defined in claim 15, further comprising a monitor capable of indicating a level of humidity in said interior environment.

17. The atomizer machine according to claim 1, further comprising a trajectory control means to control a trajectory of the particles from a periphery of said atomizer wheel to said catch tray, and wherein the trajectory control means comprises a unit for controlling a size of said aperture, disposing steam valves or the periphery of said atomizer wheel, over said atomizer wheel and directly into said enclosure, and controlling airflow patterns at the periphery of said atomizer wheel.

18. The atomizer machine according to claim 1, further comprising a reactor for producing the polymer and at least one temperature controlled conduit for feeding the polymer to the distributor.

19. The atomizer machine according to claim 18, wherein the at least one conduit consists of a double jacket tube defining an inner passage for feeding the polymer to the distributor and an outer envelope surrounding the inner passage, through which outer envelope a temperature liquid is flowed to control a level of temperature of the polymer.

20. The atomizer machine according to claim 1, wherein said distributor rotates in the same direction as said atomizer wheel.

21. The atomizer machine according to claim 1, wherein the distributor comprises a plurality of holes.

22. The atomizer machine according to claim 21, wherein the pluralty of holes are disposed in a circle.

23. The atomizer machine according to claim 21, wherein the distributor has 24 holes.

24. The atomizer machine according to claim 1, wherein said atomizer wheel has a flat surface.

25. The atomizer machine according to claim 1, further comprising a shaft for receiving said atomizer wheel, said shaft being conical and tapered so as to reduce vibrations during rotation of said atomizer wheel.

26. The atomizer machine according to claim 1, further comprising a shaft for receiving said atomizer wheel, said shaft having a threaded section for securing said atomizer wheel to said shaft.

27. The atomizer machine according to claim 1, further comprising a sorting bin for receiving and sorting the particles from said catch tray.

28. The atomizer machine according to claim 1, wherein said atomizer wheel has a perimeter, and wherein said atomizer wheel has at said perimeter radially projecting teeth.

29. The atomizer machine according to claim 1, further comprising at least one baffle disposed within the enclosure for regulating air flow within said internal environment.

30. The atomizer machine according to claim 29, wherein the at least one baffle is a plurality of baffles.

31. The atomizer machine according to claim 30, wherein the plurality of baffles comprises comprises 4 baffles.

32. A method for producing polymer particles, said method comprising providing an atomizer machine comprising:
    a) an atomizer wheel having an edge, wherein said wheel is rotatable about an axis;
    b) a distributor for depositing polymer in fluid state to said wheel, wherein said distributor has a lip with holes, wherein the holes occupy almost all the distributor lip surface and are spaced in such a way that sufficient strength of the distributor is maintained;
    c) a catch tray disposed under the atomizer wheel to collect the polymer particles formed as a result of ejection of the polymer from the edge as the atomizer wheel rotates;
    d) an enclosure, enclosing said atomizer wheel, said distributor and said catch tray, said enclosure defining a partition between an interior environment of said atomizer machine and an exterior environment of said atomizer machine; and
    e) an aperture on said enclosure allowing a gaseous exchange between the interior environment of said atomizer machine and the exterior environment of said atomizer machine;
    and wherein said method further comprises allowing gaseous exchange through said aperture thereby to regulate at least one condition of temperature, humidity or air flow within said interior environment.

33. The method of claim 32, further comprising varying a size of said aperture to vary a rate of gaseous exchange.

34. An atomizer machine for the production of porous polymer particles comprising:
    a) an atomizer wheel having an edge, wherein said wheel is rotatable about an axis;
    b) a distributor for depositing polymer in fluid state to said wheel, wherein said distributor has a lip with holes, wherein the holes occupy almost all the distributor lip surface and are spaced in such a way that sufficient strength of the distributor is maintained;
    c) a catch tray disposed under the atomizer wheel to collect the polymer particles formed as a result of ejection of the polymer from the edge as the atomizer wheel rotates, wherein the surface of the catch tray is covered with a layer of liquid;
    d) an enclosure, enclosing said atomizer wheel, said distributor and said catch tray, said enclosure defining a partition between an interior environment of said atomizer machine and an exterior environment of said atomizer machine; and
    e) an aperture on said enclosure allowing a gaseous exchange between the interior environment of said atomizer machine and the exterior environment of said atomizer machine.

35. An atomizer machine for the production of porous polymer paiticles, comprising:
    a) an atomizer wheel having an edge, wherein said wheel is rotatable about an axis;
    b) a distributor for depositing polymer in fluid state to said wheel, wherein said distributor has a lip with holes, wherein the holes occupy almost all the distributor lip surface and are spaced in such a way that sufficient strength of the distributor is maintained;
    c) a catch tray disposed under the atomizer wheel to collect the polymer particles formed as a result of ejection of the polymer from the edge as the atomizer wheel rotates, wherein the temperature of the catch tray is controlled by a heat exchanger;
    d) an enclosure, enclosing said atomizer wheel, said distributor and said catch tray, said enclosure defining a partition between an interior environment of said atomizer machine and an exterior environment of said atomizer machine; and
    e) an aperture on said enclosure allowing a gaseous exchange between the interior environment of said atomizer machine and the exterior environment of said atomizer machine.

\* \* \* \* \*

UNITED STATES PATENT AND TRADEMARK OFFICE
CERTIFICATE OF CORRECTION

PATENT NO.         : 7,207,499 B2                                      Page 1 of 1
APPLICATION NO.    : 10/343354
DATED              : April 24, 2007
INVENTOR(S)        : Barry Partington and Josee Ethier It is certified that error appears in the above-identified patent and that said Letters Patent is hereby corrected as shown below:

Column 17,
Line 53, "another vary" should read --another to vary--.

Column 17,
Line 59, "siad" should read --said--.

Column 17,
Line 65, "water in" should read --water is--.

Column 18,
Line 16, "Thr atomize" should read --The atomizer--.

Column 18,
Line 19, "recirulation" should read --recirculation--.

Column 18,
Line 38, "valves or" should read --valves at--.

Column 19,
Line 18, "comprises comprises" should read --comprises--.

Column 20,
Line 25, "paiticles" should read --particles--.

Signed and Sealed this

Twenty-fifth Day of March, 2008

JON W. DUDAS
*Director of the United States Patent and Trademark Office*